UNITED STATES PATENT OFFICE.

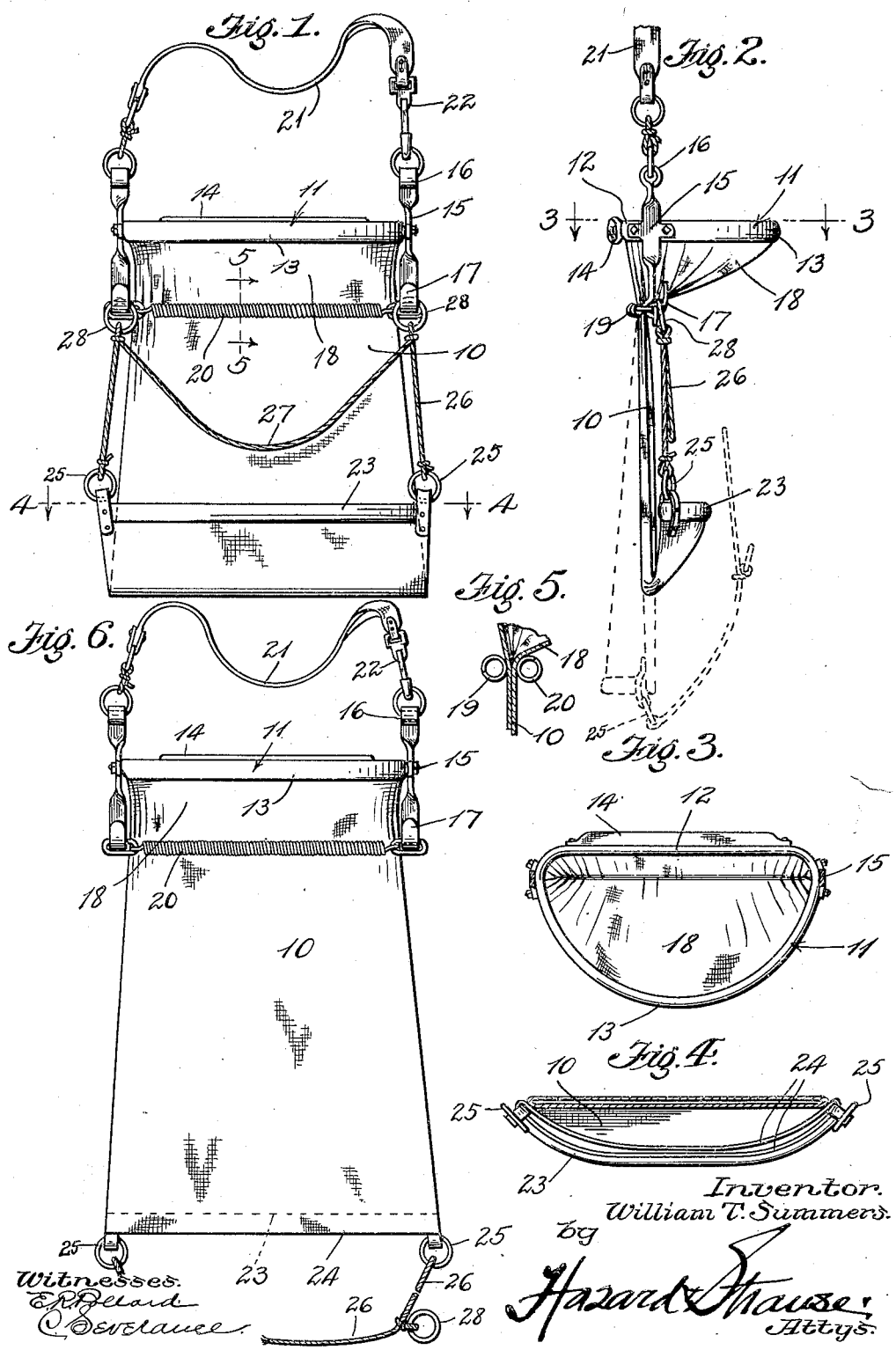

WILLIAM T. SUMMERS, OF PASADENA, CALIFORNIA.

FRUIT-PICKER'S BAG.

1,097,374.  Specification of Letters Patent.  Patented May 19, 1914.

Application filed February 14, 1912. Serial No. 677,609.

*To all whom it may concern:*

Be it known that I, WILLIAM T. SUMMERS, a citizen of the United States, residing at Pasadena, in the county of Los Angeles and State of California, have invented new and useful Improvements in Fruit-Pickers' Bags, of which the following is a specification.

This invention relates to improvements in fruit picking bags and it is an object of the invention to provide a bag into which fruit may be placed as picked and which is so formed that the fruit will drop slowly into the bag, whereby the fruit will not be injured.

It is also an object of the invention to provide a fruit picker's bag open at its upper and lower ends, but provided with intermediate retaining means of a yielding character adapted to permit the fruit to drop gently into the bag, the open lower end being also readily extended for permitting the fruit to pass out when the bag is empty.

In the accompanying drawing forming a part of this specification, Figure 1 is a side elevation of the improved fruit picker's bag forming the subject matter of this invention, the bag being in folded position and ready for receiving fruit. Fig. 2 is an edge elevation of the same. Fig. 3 is a transverse sectional view taken upon the line 3—3 of Fig. 2. Fig 4 is a similar transverse sectional view taken upon the line 4—4 of Fig. 1. Fig. 5 is a fragmentary detail sectional view taken upon the line 5—5 of Fig. 1. Fig. 6 is a front elevation of the bag with the lower end released and dropped for discharging fruit therefrom.

The details and features of the invention will now be more particularly described, reference being had to the said drawing in which—

10 indicates a flexible body portion, preferably formed of canvas or other suitable fabric, the upper edge thereof being stretched upon and secured to a frame 11. The said frame is provided with a flat side portion 12 and with an outwardly bulged outer portion 13, the flat side being designed to rest against the body of the picker. This edge of the frame 11 is therefore also preferably provided with a pad 14 secured thereto and formed of yielding material, to prevent the hard and unyielding material of the frame from engaging the body of the wearer. The ends of the said frame 11 are provided with brackets 15 which are bolted to the frame 11 near their central portions and are formed with upwardly extending parts having eyes 16, to which suspending means may be secured and downwardly extending portions which are bent into the form of open hooks 17 upon which other portions of the mechanism may be suspended. The hooks are preferably turned forwardly away from the body of the picker to facilitate the adjustment of certain parts of the bag. The hooks 17 extend downwardly a sufficient distance below the upper frame 11, to hold retaining means at such a height, that a receiving hopper or apron will be afforded near the top of the bag upon which to rest the fruit as indicated at 18. The said retaining means preferably consists of one or more coiled springs 19 and 20 which are provided with links at their ends adapted to slip upon the hooks 17. One of the said springs as for instance the spring 19 extends along the rear surface of the bag, while the other spring 20 extends along the front thereof. When only one spring is employed the spring 19 at the rear, is dispensed with and the spring 20 at the front coöperates with the body of the picker in retarding the dropping of the fruit. The springs are made sufficiently taut to tend to lock or close the bag opposite the said hooks 17, thus drawing the fabric into the position shown in Figs. 2 and 3 whereby a receiving apron or hopper 18 is afforded. The springs however, are sufficiently yielding to permit the fruit to readily squeeze past the same when a small quantity thereof is collected upon the apron 18. The resilient yielding springs permit the fruit to work its way slowly into the body portion of the bag so that there is no danger of injuring the said fruit in any way. A suspending strap or band 21 is secured at its ends to rings fastened in the eyes 16. A releasing device as for instance a snap hook 22 is provided for facilitating the easy strapping of the bag to the shoulders of the picker. The lower end of the bag 10 is also open and is distended to a proper degree by securing a bar 23 to the outer or front face of the material at the lower edge thereof. Said bar is secured to the material as shown in Fig. 4, the lower edges of the bag as indicated at 24 resting within the same and when the end of the bag is turned upwardly as shown in Figs. 1 and 2, serving to fit against the body of the wearer and prevent fruit from dropping out of the bag. When the lower end of the bag is dropped to the position shown in dotted lines in Fig. 2 and in full lines in Fig. 6, the band by its shape tends to facilitate the discharge of the fruit through the open lower end of the said bag. In order to hold and readily operate the lower end of the bag, the ends of the bar 23 are provided with rings 25 to which are secured the ends of a cord or chain 26. The said cord is looped sufficiently to form a hand hold at 27 by which the operator may raise or lower the end of the bag. Intermediate rings 28 are secured to the said cord and adapted to be hooked upon the hooks 17 for holding the bag in closed position at the bottom.

When the bag is full of fruit and it is desired to discharge the same, the picker releases the rings 28 from hooks 17 and grasping the loop portion 27 of the cord permits the bottom of the bag to drop over any suitable receptacle so that the fruit will gently roll into the same. The picker then restores the eyes 28 to the hooks 17 for closing the bottom of the bag again. It will be observed that the arrangement of the brackets 15 upon the frame 11 is such that the body portion of the bag from the point of its contraction downwardly and the suspension cord 26, in supporting the lower end of the bag, hang in alinement with each other from the shoulder strap, the back portion of the bag being thus maintained comparatively straight and flat so as to rest upon the body of the picker.

It will be understood that ordinarily only one spring, namely the spring 20 need be employed since the resting of the bag against the body at the back in conjunction with said front spring 20, is sufficient to cause the fruit to drop slowly into the bag. In handling lemons however, where the fruit is exceedingly tender, it is found very advantageous and safer to employ two springs, one as 19 at the back and the other as 20 at the front.

What I claim is:

1. A fruit picker's bag comprising a tubular body portion formed of a flexible material having suspension means attached thereto, and resilient bag contracting means attached to said body portion at the front thereof intermediate its opposite ends, whereby when the bag is suspended on a person the body of said person will coöperate with the resilient means to constrict the opening through the body portion so that when fruit is dropped into the upper end its fall to the lower end will be retarded.

2. A fruit picker's bag comprising a supporting frame having a fabric body portion open at both ends supported thereon, spring supporting means extending from said frame, and springs secured to said supports engaging the intermediate portion of the said fabric for laterally constricting the opening through said bag and restricting the fruit in its passage into the bag so as not to injure the fruit.

3. A fruit picker's bag, comprising a fabric body having a yielding back portion, a frame supporting the upper end thereof having a flat body engaging portion and an outwardly projecting hopper forming portion, brackets rigidly secured to said frame, suspending means connected with the upper portion of said brackets, resilient constricting means secured to the lower end of said brackets, a frame secured to the lower end of the fabric body, and means for supporting the lower end of the bag upon said brackets in folded position.

4. A bag having a flexible body portion open at both ends, a distending supporting rim having downwardly extending arms secured thereto at the upper end thereof to facilitate the insertion of fruit into the bag, and a spring mounted transversely of and at the front of said body portion and below said distending rim, whereby the fruit inserted into said body portion at the top thereof will be retarded in its fall through the opening into the lower end of the body portion, the ends of said spring being connected to the downwardly extending arms secured to said supporting rim.

5. A fruit picker's bag, comprising a flexible body portion, a supporting frame at the upper end, hooks depending therefrom, movable spring means carried by said hooks and adapted to contract the central portion of the bag for retarding the dropping of the fruit and means for holding the lower end of the bag in folded position.

6. A fruit picker's bag, comprising a tubular body portion formed of flexible material, means to open and close the lower end thereof, suspension means attached to the upper end thereof, a distending frame having downwardly extending arms secured to the upper portion of the body portion, and resilient means attached to said downwardly extending arms of said distending frame at the front thereof intermediate its ends, whereby, when the bag is suspended on a person the resilient means will cause a contraction of the body portion at its point of application to retard the fall of fruit from the upper to the lower end of said body portion.

In witness that I claim the foregoing I have hereunto subscribed my name this 5th day of February, 1912.

W. T. SUMMERS.

Witnesses:
EDMUND A. STRAUSE,
EARLE R. POLLARD.

Copies of this patent may be obtained for five cents each, by addressing the "Commissioner of Patents, Washington, D. C."